United States Patent
Megdal

(10) Patent No.: US 10,332,151 B2
(45) Date of Patent: Jun. 25, 2019

(54) METHOD AND SYSTEM FOR USING MEDIA POINTS TO INFLUENCE CONTENT DELIVERY

(71) Applicant: Blake F. Megdal, Beverly Hills, CA (US)

(72) Inventor: Blake F. Megdal, Beverly Hills, CA (US)

(*) Notice: Subject to any disclaimer, the term of this patent is extended or adjusted under 35 U.S.C. 154(b) by 307 days.

(21) Appl. No.: 14/693,205

(22) Filed: Apr. 22, 2015

(65) Prior Publication Data

US 2015/0348110 A1    Dec. 3, 2015

Related U.S. Application Data

(60) Provisional application No. 62/004,023, filed on May 28, 2014.

(51) Int. Cl.
*H04W 4/02* (2018.01)
*G06Q 30/02* (2012.01)
*H04L 29/08* (2006.01)

(52) U.S. Cl.
CPC ..... *G06Q 30/0261* (2013.01); *G06Q 30/0267* (2013.01); *H04L 67/18* (2013.01); *H04L 67/20* (2013.01); *H04W 4/02* (2013.01)

(58) Field of Classification Search
CPC ...... G06Q 10/02; G06Q 20/102; G06Q 20/14; G06Q 20/202; G06Q 20/208; G06Q 20/24;
(Continued)

(56) References Cited

U.S. PATENT DOCUMENTS

| 7,089,195 | B2 * | 8/2006 | Rosenberg | G06Q 30/00 705/14.69 |
| 7,103,368 | B2 | 9/2006 | Teshima | |

(Continued)

FOREIGN PATENT DOCUMENTS

WO    WO 2013/025803 A1    2/2013

OTHER PUBLICATIONS

Nesbitt, Daniel, et al., *User-Defined Gestures for Connecting Mobile Phones, Public Displays, and Tabletops,* retrieved at http://hci.uni-hannover.de/papers/kray2010gestures.pdf, MobileHCI, Sep. 7-10, 2010, Lisbon, Portugal, 10 pages.

(Continued)

*Primary Examiner* — Chrystina E Zelaskiewicz
*Assistant Examiner* — Chinyere Mpamugo
(74) *Attorney, Agent, or Firm* — Lewis Roca Rothgerber Christie LLP

(57) ABSTRACT

Method for influencing content delivery to a mobile device used by a user includes: receiving a request for content delivery from the mobile device, over a computer network; obtaining a location of the mobile device; identifying one or more media points in proximity to the obtained location of the mobile device; obtaining type, location and display size of the identified one or more media points, from one or more databases; determining a strength of an exposure of the user to said identified one or more media points, based on the type, location and display size of the identified one or more media points and the location of the mobile device; selecting a relevant supplemental content for delivery to the mobile device, based on said determined strength of an exposure of the user to said identified one or more media points; and delivering said selected relevant supplemental content and the requested content to the mobile device over the computer network.

12 Claims, 6 Drawing Sheets

(58) Field of Classification Search
CPC ............ G06Q 20/327; G06Q 20/3567; G06Q 20/40145; G06Q 30/0217; G06Q 30/0253; G06Q 30/0267; G06Q 30/0241; G06Q 30/02; G06Q 30/0261; G06Q 50/01; G06Q 30/0277; G06Q 30/0207–0277
See application file for complete search history.

(56) References Cited

U.S. PATENT DOCUMENTS

| | | | |
|---|---|---|---|
| 8,254,338 B2 | 8/2012 | Anschutz et al. | |
| 8,433,240 B2 | 4/2013 | Slotznick | |
| 8,505,054 B1 | 8/2013 | Kirley | |
| 8,559,977 B2 | 10/2013 | Busch | |
| 8,635,058 B2 | 1/2014 | Patel | |
| 2003/0046158 A1 | 3/2003 | Kratky | |
| 2004/0192351 A1 | 9/2004 | Duncan | |
| 2008/0077469 A1* | 3/2008 | Philport | G06Q 30/02 705/7.32 |
| 2008/0248815 A1* | 10/2008 | Busch | H04W 4/029 455/456.5 |
| 2009/0030780 A1* | 1/2009 | York | G06Q 30/02 705/14.41 |
| 2009/0149199 A1 | 6/2009 | Maghoul | |
| 2009/0307061 A1* | 12/2009 | Monighetti | G06Q 30/02 705/50 |
| 2013/0145288 A1 | 6/2013 | Zadeh et al. | |
| 2013/0191226 A1* | 7/2013 | Smallwood | G06Q 30/02 705/14.68 |
| 2014/0040016 A1 | 2/2014 | Amla et al. | |
| 2014/0062687 A1 | 3/2014 | Voticky | |
| 2014/0068451 A1 | 3/2014 | Ngo et al. | |
| 2014/0103104 A1 | 4/2014 | Jover et al. | |
| 2014/0164125 A1* | 6/2014 | Taylor | G06Q 30/0267 705/14.58 |
| 2015/0149285 A1* | 5/2015 | Schroeter | G06Q 30/0261 705/14.58 |
| 2015/0317685 A1* | 11/2015 | Maghoul | G06F 17/3087 705/14.54 |
| 2016/0162931 A1* | 6/2016 | Harik | G06F 16/68 705/14.45 |

OTHER PUBLICATIONS

Scheible, Jürgen, *MobiLenin-Combining A Multi-Track Music Video, Personal Mobile Phones and a Public Display into Multi-User Interactive Entertainment,* retrieved at http://www.mlab.uiah.fi/~jscheib/myweb/MobiLenin_acm_Multimedia2005.pdf, MM, 2005, Singapore, 10 pages.

* cited by examiner

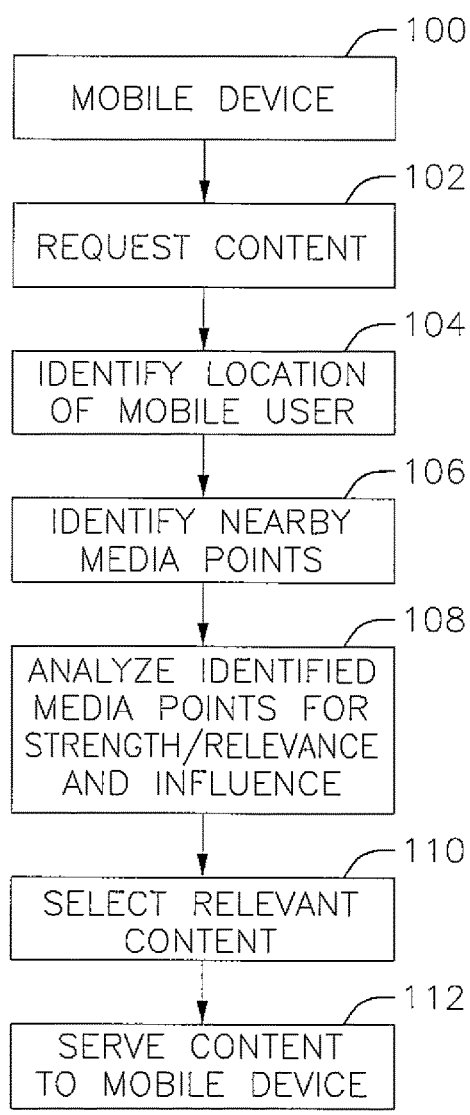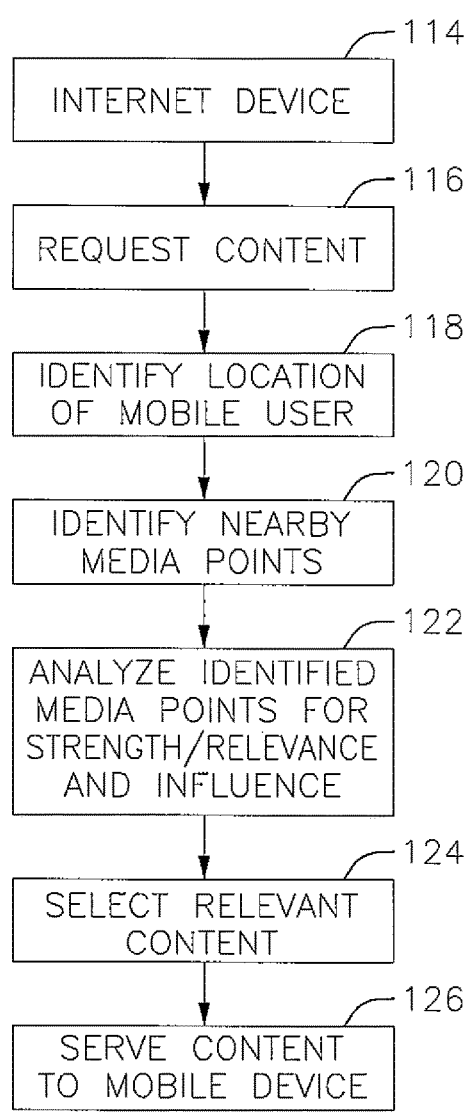

METHOD AND SYSTEM FOR USING MEDIA POINTS TO INFLUENCE CONTENT DELIVERY

CROSS-REFERENCE TO RELATED APPLICATIONS

This patent application claims the benefits of U.S. Provisional Patent Application Ser. No. 62/004,023, filed on May 28, 2014 and entitled "Method For Using Outdoor Media To Influence Content Delivery," the entire content of which is hereby expressly incorporated by reference.

FIELD OF THE INVENTION

The present invention relates generally to targeted advertising or content delivery, and more particularly to method and system for using media points to influence content delivery.

BACKGROUND

The outdoor and out-of-home media market is a part of daily lives, both in urban and rural areas. People drive or walk past countless billboards on streets and highways, take public transportation, shop in stores, and walk through airports that are increasingly filled with LED screens that promote various products and content, and go to landmark locations like Time Square and the Sunset Strip, where outdoor advertisements and media messaging both dazzle and define the visual landscape.

The outdoor and out-of-home media networks are increasingly moving from static to digital mediums. Digital mediums relative to their static counter parts, can be far more easily tracked, networked, aggregated than previous generations' static images. Central computers that control networks of media points determine exactly what images are shown where and when. This in turn will create a huge glut of location specific information about media points and out of home messaging.

Aggregating media points is critical to understanding what a user is seeing and experiencing at a given location or within a geographically defined area and not just where that person is and or what businesses they are in proximity to.

SUMMARY

In some embodiments, the present invention is a computer-implemented method for influencing content delivery to a mobile device used by a user. The method includes: receiving a request for content delivery from the mobile device, over a computer network; obtaining a location of the mobile device; identifying one or more media points in proximity to the obtained location of the mobile device; obtaining type, location and display size of the identified one or more media points, from one or more databases; determining a strength of an exposure of the user to said identified one or more media points, based on the type, location and display size of the identified one or more media points and the location of the mobile device; selecting a relevant supplemental content for delivery to the mobile device, based on said determined strength of an exposure of the user to said identified one or more media points; and delivering said selected relevant supplemental content and the requested content to the mobile device over the computer network. The selected relevant supplemental content may be an advertisement or a coupon.

In some embodiments, the proximity to the obtained location of the mobile device may be set as a system parameter by the user, or dynamically changed as a function of one or more of the type, content, size and location of the media point.

In some embodiments, the present invention aggregates and stores many exposures of the user to several of media points over a period of time; infers historically relevant data for the preferences or behavior of the user from the aggregated data; and selects the relevant supplemental content based on the historically relevant data. The many exposures of the user may include analyzing travel routes of the user over said period of time.

In some embodiments, the present invention computes a direction vector of the movement of the mobile device; and uses the computed direction vector in determining the strength of the exposure of the user to the identified media points. In some embodiments, the present invention utilizes the computed direction vector to predict which next media point the user is approaching; estimates how long would it take for the user to be potentially exposed to that next media point; and delivers a second selected relevant supplemental content to the mobile device, as the user approached that next media point.

BRIEF DESCRIPTION OF THE DRAWINGS

FIGS. 1A and 1B are exemplary simplified process flows, executed by one or more processor, according to some embodiments of the present invention.

DETAILED DESCRIPTION

Figure 2:
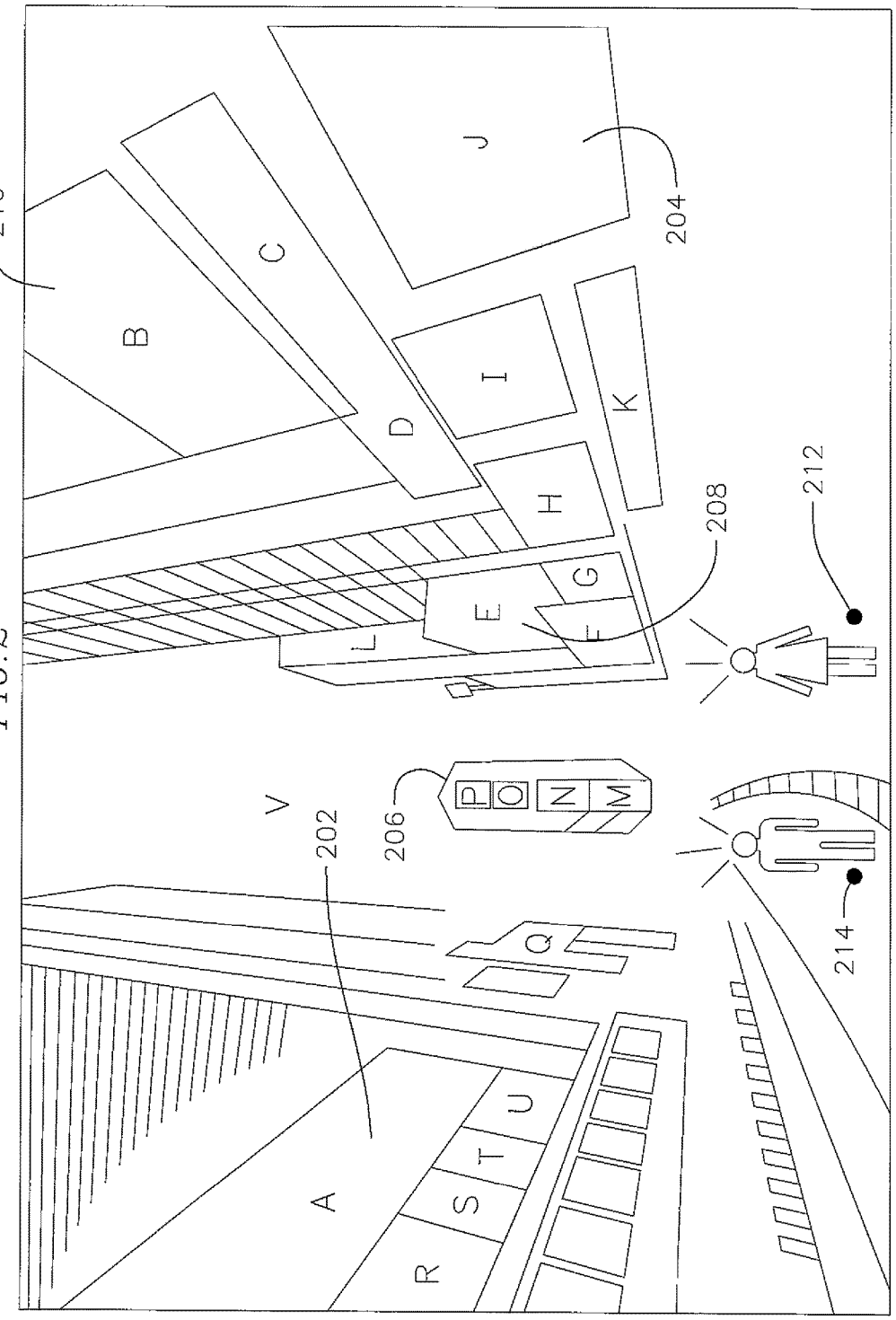
FIG. 2 shows an example of the media points used to influence content delivery to a user, according to some embodiments of the invention.

In some embodiments, the present invention is a computer-implemented method of using the location and real-time content of outdoor and out-of-home media points, such as billboards, digital billboards, in-store digital (e.g., LED based) advertisements, business and commercial signage and messaging and other similar media devices, to influence Internet and/or wireless mobile content delivery, such as advertising, product and service information, discounts and coupons, and other types of information related to the location of the outdoor media, its content and the location of the mobile or Internet device, to users that are near or around such media points.

In some embodiments, the invention, executing on one or more computers, correlates and aggregates outdoor media points with their real time content, for example, from multiple databases, obtains a user's location, determines the location relative to one or more media points, and uses the user's proximity to the mapped media points, and other actors (described below) to influence which media contents (e.g., Internet and mobile ads) to be delivered to the particular user. Media content may include audio, video, images, graphics, and/or other types of media content, such as advertisement that is relevant to the mobile or Internet user. The aggregation of out-of-home media points allows advertisers to retarget consumers that have already been exposed to a given message in the real "world" with related Internet and mobile advertisements.

In some embodiments, the locations of media points can be obtained by a location determination unit, such as a global positioning system (GPS) device. Alternatively or in addition, whenever a media point is installed in a location, the information about the media point, including its location, owner, a server or a servicing company that manages and supports its contents, and other relevant information is stored in a database relevant to that media point. The locations of the media points are then transmitted to a server which may implement one or more geo-based databases including data records for each media point, which are indexed by location. The invention then accesses the one or more geo-based databases, which also link product and manufacturer information to geographic locations of the corresponding media point.

When a mobile or Internet user enters a location in close (predetermined) proximity to a media point (for example, a zone), the invention retrieves information related to the content that is currently (or within a certain amount of time) being displayed by the media point at the time the user is close (within the zone) to the media point. The invention also obtains and/or computes information about the user preferences, and other external factors, discussed below, to deliver content to the user and/or change the display on the media point, via the server or the computer that controls the media point, to suit the user's preferences, location and other factors.

In some embodiments, even though an Internet or mobile user may not be directly near or in close proximity to a particular media point, the invention can aggregate the media points in a larger geographical area around the user, for example, a media point-intensive zone, infer and extrapolate the interaction and influence of various media points on a particular mobile or Internet user within the geographical area. Based on the inferred and/or extrapolated information, the invention will then influence the content that is delivered to a user's mobile device based on of one or more of the media points.

According to some embodiments, the invention aggregates and uses the location and real-time content of outdoor and out-of-home media points, including billboards, digital billboards, in-store LED/LCD-based advertisements, and other similar media devices, to influence Internet and mobile ads delivered to users that are nearby relevant media points. For a given user, the invention determines what media points are nearby, if any, and serves to the user Internet and mobile ads that are influenced by and relate to the content of those relevant media points. For example, the invention may deliver to the user more information about the products or services that are being displayed on the media point, including how to contact a product/service provider and any available promotional deals or discounts.

In some embodiments, the invention uses text to determine a user's location, future location or a certain location of interest. For example, a user may be reading an article about Las Vegas online, searching for Las Vegas in a search engine or posting on social media about Las Vegas. The invention may accordingly influence online and mobile ads distributed to users that reference certain geographical areas with content related to and/or influenced by media points located in the geographical area referenced by the user and/or text. For example, a user may post on Facebook™ that he is going to the Lakers game at Staples Center™ in Los Angeles. The invention would aggregate the media point the user will likely be exposed to at and around Staples Center™; ads delivered to the user before and after the game may be influenced by the aggregated media points.

In some embodiment, instead of, or in addition to, delivering relevant content to the user, the invention may influence the content of the information displayed on the media points, for example, if there are adequate number of users with similar interests in certain proximities to the media points.

According to some embodiments, the invention, executing on one or more computers, determines the probability that a user has been exposed and influenced by various media points, depending on factors such as the user's location, her direction of travel, orientation and the amount of time the user was around the relevant media point. In some embodiments, the invention factors in the media points nature, location, surroundings, size, orientation and even the strength of the image/content itself to determine the influence the media point had on a user. In some embodiments, the invention combines multiple media points and estimates the collective influence of multiple images and influences on a given user. For example, if a particular user is exposed to both an outdoor beer ad and also a soda/beverage ad, the invention may serve the user a beer or soda ad or an image that is associated with both beer and soda imaging, such as, a sports related ad or image, or other images associated with the collective beer and soda messaging.

According to some embodiments, the invention is capable of using a user's multiple known locations to extrapolate the likelihood and the degree that the user was exposed and influenced by the given media points. Factors such as type, size, content, and/or location of the media points and/or the length of exposure time of the user to the media points may also be considered to determine the likelihood and the degree that the user was exposed and influenced by the media points. Further, the invention may use the actual duration a user was nearby a given media point or the estimated/presumed duration a user was near a media point to determine whether and how that user was influenced by the given media point. If a user is located in a stadium where there are many media points, the invention provides more weight to the media points at the stadium since the user is presumed to be at the stadium for a large amount of time and therefor exposed to the messaging for a longer period of time. If a user is on the highway and passing a billboard, the invention places less weight on the media point because it presumes the user will have only glanced at the messaging for a very brief moment. If the same Internet and/or mobile device communicates it location multiple times to the network and is at the same location for all of the multiple times, the invention would know how long the user has been around the given media point, and can add weights accordingly.

Figure 6:
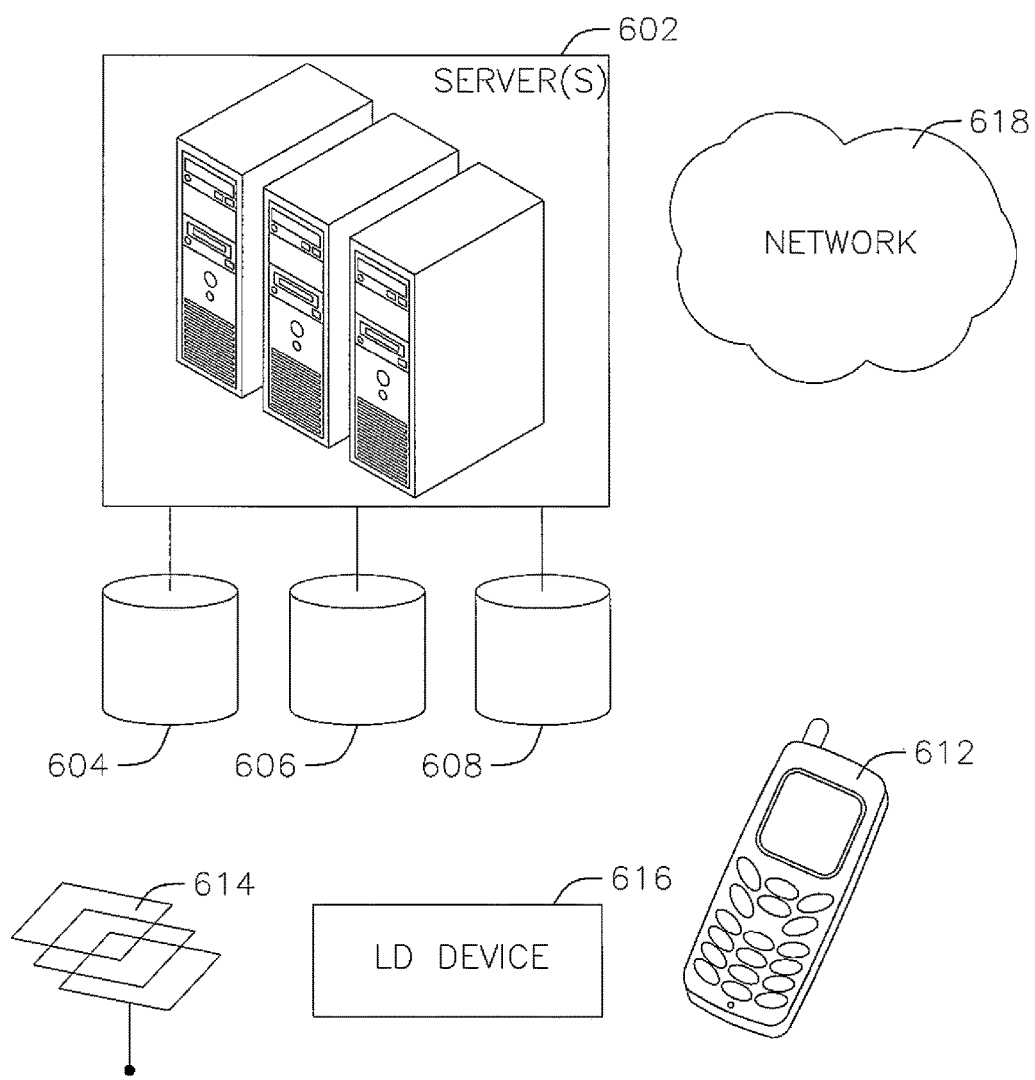
FIG. 6 is an exemplary block diagram, according to some embodiments of the invention.

FIG. 6 is an exemplary block diagram, according to some embodiments of the invention. As shown, one or more servers 602 host a software application according to the present invention. A mobile device 612 used by a user in communication with the server(s) 602 via a computer network 610, such as the Internet. One or more databases 608, in communication with the servers 602 and the mobile device 612, store information about the user and her device such as user preferences, user demographics including gender and age, historical data about the user and other user related information. One or more databases 606, in communication with the servers 602, store environmental information, such as weather, traffic patterns, landmarks, other barriers or distractions and other factors related to the surroundings of the user and media points 614. One or more databases 604, in communication with the servers 602, store information about a plurality of media points 614, including media points nature, location, surroundings, size, orientation, owner, owner information, scheduled content to be displayed, the strength of the image/content and other media point related information. Optionally, a location determination device or service 616 such as a global positioning system (GPS) device, accessible over the computer network 610, obtains the locations of the media points 614, which may then be stored in the databases 604. The location determination device or service 616 may also be employed to determine the location of the mobile device 612, by using various known location determination methods, if necessary.

In some embodiments, the invention, executing on one or more computers, determines a direction vector of the mobile user's movement. This way, the invention would know whether the mobile user is moving towards or away from a media point, which may be a factor in determining the probability and extent that the user was exposed to the content of the media point. According to some embodiments, the invention may also factor weather conditions in the area of the media point to determine the probability and the extent to which the user was exposed and/or influenced by the given media point. The direction vector may also be used to predict which next media point the user is approaching (and the time that it will take the user to get near that media point) and estimate how long would it take for the user to be potentially exposed to that next media point. This information can then be employed to deliver related content to the user and/or influence the displayed content of the next media point, just before the user arrives within the proximity of the next media point.

According to some embodiments, the invention may aggregate and store many exposures and/or interactions between a user and certain media points over an extended period of time to infer historically relevant data to the preferences and/or behaviors of the user. For example, the invention can determine if a user is exposed to the same messaging over the period of a few days, weeks or months, by analyzing the user's travel routes over that period of time. This information can then be used to determine the probability and/or the extent that the user was exposed to the content of the media points, for example, by assigning different values and/or weights to different interactions and taking a weighted averaging of the accumulated weights. For example, the invention may assign individual values to the information obtained from the databases 606, 608 and 608, and other relevant factors. In some embodiments, a weighted average of these values is determined to render a value for the probability and/or the extent that the user was exposed to the content of the media points.

According to some embodiments of the invention, given the strength of the user-media point interaction, the invention can estimate how long a given user can be expected to remember and be influenced by the media point. For example, if a particular user has been in a stadium and exposed to given media points for a few hours, the invention can serve the user a similar mobile or Internet content over a longer period of time because the influence of the media point was strong and presumed to last longer. Contrastingly, the invention would likely need to serve a user a similar mobile or Internet ad in much closer temporal proximity for a user that glances as a digital billboard.

In some embodiments, the invention assigns different weight factors to each of the (nearby) media points based on the display size, location, type, nature and/or the (estimated) amount of time that a mobile device user is or may be exposed to that media point. For example, a larger display size, such as billboards on the roadsides get a larger weight factor than an LED display in or on a bus, or airport. Similarly, if the media point is in a captured location, such as a stadium, a bus stop, inside a bus, or a clear view non-crowded are, a larger weight factor is assigned than a weight factor assigned to a more "transient," crowded or obscure location of the media point. Likewise, larger weight factors may be assigned to multi-media types of media points, which include video and/or sound than static advertisement images, because it is assumed that the user is likely to be more influenced by multi-media types of media points than static images. Also, ads for household, consumer, entertainment (e.g., sports, shows) or eatable items may be assigned a larger weight factor than the big items, such as cars or houses. Similarly, the more time that the user spends or estimated to spend nearby the media point the larger the weight factor for that media point becomes, since the longer period of the potential exposure is likely to more influence the user and thus result in a higher strength of that media point.

According to some embodiments, the invention creates certain geographically defined regions (zones) and aggregates and ranks media points on their prominence within each geographically defined region. The prominence of the media points may be calculated as a function of one or more of the display size, location, type, nature and/or the (estimated) amount of time that a mobile device user is or may be exposed to a media point, as explained above. The invention then influences mobile and Internet ads delivered to users located within the geographically defined region based on the aggregation of media points within the geographically defined region and not the exact position of the user relative to any specific media point. For example, the invention might create a geographically defined area around the Las Vegas Strip and aggregate all the media points within the area, score them by their prominence within the geographically defined area, factoring such things as size, static or digital, video, content etc. A user that is located within the geographically defined region around the Las Vegas strip would see mobile and Internet ads influenced by the general landscape of all media points within the geographically defined region.

In some embodiments, the closer the user gets to the proximity of a media point that media point get a higher weight factor for its influence on the user, among the aggregated media points. As a result, that media point gets more influence on the content to be delivered to the user.

FIGS. 1A and 1B are exemplary simplified process flows, executed by one or more processor, according to some embodiments of the present invention. FIG. 1A illustrates how a mobile user's location relative to media points can be used to influence content delivery to the user's mobile device. FIG. 1B shows how a user's location relative to media points can be used to influence content delivery to the user's Internet (browser) device. As shown in block 100, a mobile user is using a cell phone, PDA or other mobile device, while moving in an urban area or country side. In block 102, a software application, executing on the mobile device, requests a content such as an ad or other information, from a content network or content delivery system. The network may be a computer network, such as the Internet, or other networks, such as cellular networks or the like. The application requesting the content may include a web browser, mobile enabled web site, an app (mobile app), and/or any other software operating on the mobile device. The content network or content delivery system that receives the content request may be operated by a third party. In block 104, the user's location is obtained or determined, by various known methods.

In block 106, any and all media points nearby the mobile device/user's location that the user could have been exposed to or influenced by are identified. Moreover, the content itself or the type/nature of the content that is being shown on each or a particular media point is obtained in real time, for example, from various databases that manage those media points and their contents. In block 108, the strength of the nearby media points relative to the mobile user are determined and the strength of the exposure of the mobile user to the media points are analyzed, factoring in both the media point characteristics/parameters and any information known about the mobile user and the environment, in which the user/device is located.

Such factors include, but are not limited to, the user's proximity to the media point, the type of media point (billboard, stadium scoreboard, in-store LED screen, etc.), the location of the media point, the amount of time the user is actually (or estimated to be) around the media point, the amount of time a user is expected to be around the media point given its nature and location (for example, stadium vs. billboard), display size of the media point, the nature of the content being displayed (video, digital or static), the actual image and messaging on the media point, the nature of the surrounding environment relative to the media point (are there lots of distractions in the area, for example, traffic, weather, speed and direction of travel), the other media points (e.g., types and numbers) in the area (are there other images and media points in the area that will also attract the user's attention), time of day, and the qualities know about the mobile user including gender, age and other traits.

Information about the nature of the surrounding environment, such as traffic patterns, weather, landmarks and other barriers or distractions may be retrieved from live or real time related databases, for example, database 606, shown in FIG. 6. Some of the information may be inferred from the historical data and patterns. User specific information, such as preferences and habits are stored in and retrieved from a user profile. The user profile and some of the databases may be stored in the mobile device, or stored remotely (e.g., in database 608 of FIG. 6) and accessible by the mobile device. In some embodiments, relevant data, information or portion of the databases may be stored dynamically on the mobile device based on the location of the mobile device. For example, if the mobile device (user) is in a certain neighborhood, only the geo-based information for that particular neighborhood is loaded onto the mobile device.

In addition, the probability that a user has been exposed to one or more of media points may be determined from the various factors, mentioned above and may be utilized to deliver content to the user and change the display on certain media points that suits the mobile user. In some embodiments, the probability is calculated to assign a certain weight to each of the relevant factors and calculating a weighted average of summation of all of the weights. In block 110, the invention selects one or more relevant supplemental content (for example, an ad or a coupon), based on the factors (or probability) determined in block 108. In block 112 the relevant supplemental content is delivered to the mobile user and displayed on the display screen of the mobile device, along with the requested content.

For example, a given mobile user may be located along the Las Vegas Strip and is using a mobile app on his mobile device (e.g., a smart phone) to find nearby restaurants. The mobile app knows the user's location and that the user is male and 28 years old. The user queries the app for nearby restaurants. At the top of the restaurant results, the mobile app is set to display a large banner ad to the user. When the user queries the mobile app for a local restaurant list, the mobile app communicates with a server (e.g., a mobile ad agency) and requests an ad or a coupon for delivery to the mobile device. The server according to the present invention identifies what media points are near the user/device and the content that is displayed on the nearby one or more media points at the time the content is requested by the query. The invention identifies three large digital displays on Las Vegas Boulevard that are in direct view of the user. One display is showing a digital image of a Las Vegas concert/show; another is a video of a large beer being poured into a glass with the message "Drink Brand X Beer"; and the last media point is a large static board that is welcoming a local real estate convention to Las Vegas. The invention then serves a banner ad with the same or similar image as that on the large digital beer board. The invention displays the beer ad because the media point with the beer ad was a video, that is, the nature of the content is more likely to influence the user, the user is likely about to eat and drink in a restaurant, and the user was both young and male and therefore most likely to be influenced by the beer message relative to the other two media points.

Blocks 114 to 126 in FIG. 1B parallel blocks 100-112 in FIG. 1A, for an Internet user. In block 114, a user is operating an Internet device, which may include a computer, PC, mobile device or any other device connected to the Internet. In block 116, an application running on the Internet device requests a content from a content network or content delivery system. The application requesting the content may include a web browser, Internet abled application (app), or any other software operating on the Internet device. The content network or content delivery system that receives the content request may be operated by for example, an online ad agency, such as Google™. Block 118 identifies the user's location if available to the content delivery mechanism or mobile application requesting the content. Block 120 identifies any and all media points nearby (a parameter, which may be set by the system) the mobile user's location that the mobile user could have been exposed to or influenced by and what content (e.g., type and/or nature) is being shown on that particular media point in real time.

Block 122 determines the strength of all nearby media points relative to the Internet user and analyses the strength of the interaction between the Internet user and the media points, factoring in both the media point itself and any information known about the Internet user. Such factors in Block 122 include but are not limited to the user's proximity to the media point, the nature and size of the media point, nature of the surrounding environment, the probability that a user has been exposed to one or more of media points, the nature and size of the contents being displayed on the media point, the other media points in the area, time of day, and the qualities known about the Internet user including gender, age and other traits. In block 124 the technology chooses a relevant ad based on the factors analyzed in block 122. In block 126 the ad is delivered to the mobile user.

This way, according to the present invention, the media point is passive with respect to the user and therefore existing electronic media points can be used with the present invention without any further modification. In other words, the media point is not sensing, receiving, or transmitting any signals from or to the mobile user, other than displaying the content or changing that display. The information about the location, owner, type, nature and time of the content, and other information related to the media point is retrieved from one or more databases by the present invention. For example, certain cities or neighborhoods therein may have a database that stores all the above-mentioned information about the media points in that city or neighborhood.

FIG. 2 shows an example, from eye level, of what media points may be determined by the invention to be relevant to a user given his/her location and therefore used to influence ad delivery to that particular user, according to some embodiments of the invention. As shown, two mobile users, labeled 212 and 214 are exposed to multiple media points at a specific location; a few of those media points are labeled 202, 204, 206, 208 and 210 in FIG. 2. In this example, the invention identifies all the media points around the specific location (zone) where the user is or predicted to be, and what messages are being run on those media points in real time. The threshold (boundaries) of proximity of the identified media points to the location of the user or how close the media points should be to the user may be set as a system parameter, by each user, or change as a function of one or more of the factors described above. For example, the thresholds may vary based on the type, content, size and/or location of the media point, the time of the day, traffic, other media points around, weather, direction and speed of the travel and the like.

Once all media points in proximity of the users are identified, the invention identifies the media points that are most influential and relevant to mobile users 212 and 214, factoring the mobile users' proximity to the media point, the size of the media point, the user preferences, and all the other factors described above. For user 212, given his/her location and orientation (or direction of travel), the media points at 204, 208, and 210 may be weighted more heavily than the other media points at the location. Likewise user 214 may be more influenced by the media points at 202 and 206 as they are both closer to user 214 and the user is oriented towards them more so than the other media points in FIG. 2. When user 212 operates a mobile device near this location and an application on the mobile device requests a content (e.g., an advertisement) to be displayed on user's mobile device, the invention serves a content that is influenced by one or more of the media points that the user 212 is likely to be exposed to and influenced by, at this location, such as media points 204, 208, and 210. Mobile ads may be influenced by showing similar ads to user 212 who has been exposed to at the location, competitors of images and messaging user 212 has been exposed to at the location, or products and images that complement the images and messaging user 212 has been exposed to at the location, or in any other way that in practice may be shown to be effective.

Figure 3:
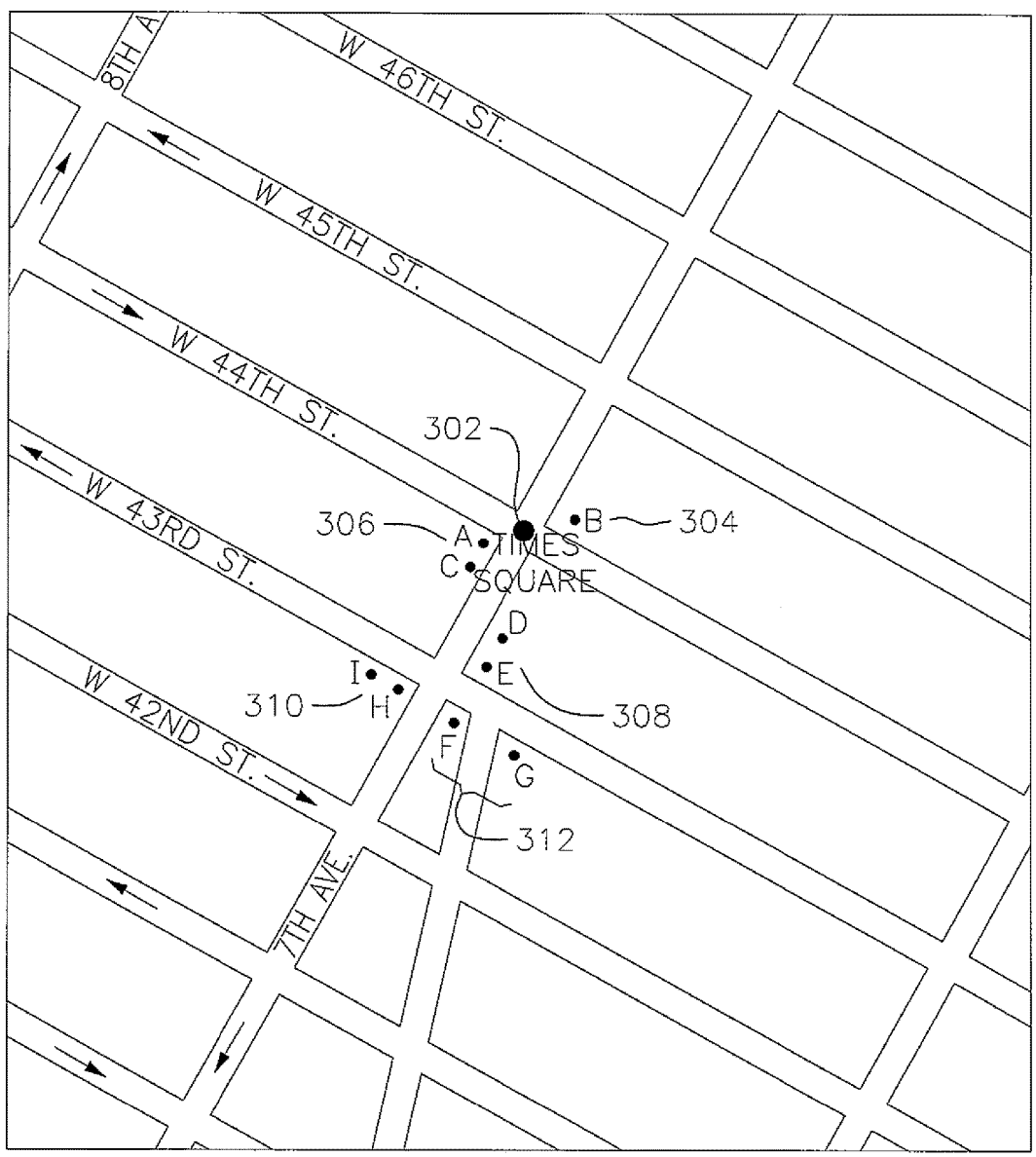
FIG. 3 depicts an example, from an aerial perspective, of what media points may be determined to be relevant to a user given his/her location and therefore used to influence content delivery to that user, according to some embodiments of the invention.

FIG. 3 depicts an example, from an aerial perspective, of what media points may be determined by the invention to be relevant to a user given his/her location and therefore used to influence content delivery to that user, according to some embodiments of the invention. As shown, mobile or Internet user 302 is exposed to multiple media points at a certain location; a few of those media points are labeled 302, 304, 306, 308, 310, and 312 in FIG. 3. In this scenario, the invention identifies all the media points at this location and what messages are being run on those media points in real time. Once all media points are identified, the invention identifies the media points that are most influential and relevant to mobile or Internet user 302, factoring the mobile or Internet users' proximity to the media point, the size of the media point and all the other factors described above. For user 302, the media points at 304 and 306 may be weighted more heavily than the other media points at the location since media points 304 and 306 are closest to user 302 and are oriented directly in user 302's field of vision.

When the user 302 operates a mobile or Internet device near this location and an application on the mobile or Internet device requests an advertisement to be displayed on user's mobile or Internet enabled device, the invention would serve an ad that is influenced by the media point(s) that user 302 is likely to be exposed to and influenced by at this location, such as media points 304, 306 and 308. Mobile and Internet ads may be influenced by showing similar ads to those user 302 has been exposed to at the location, competitors of images and messaging user 302 has been exposed to at the location, or products and images that complement the images and messaging user 302 has been exposed to at the location, or in any other way that may in practice may be shown to be effective.

Figure 4:
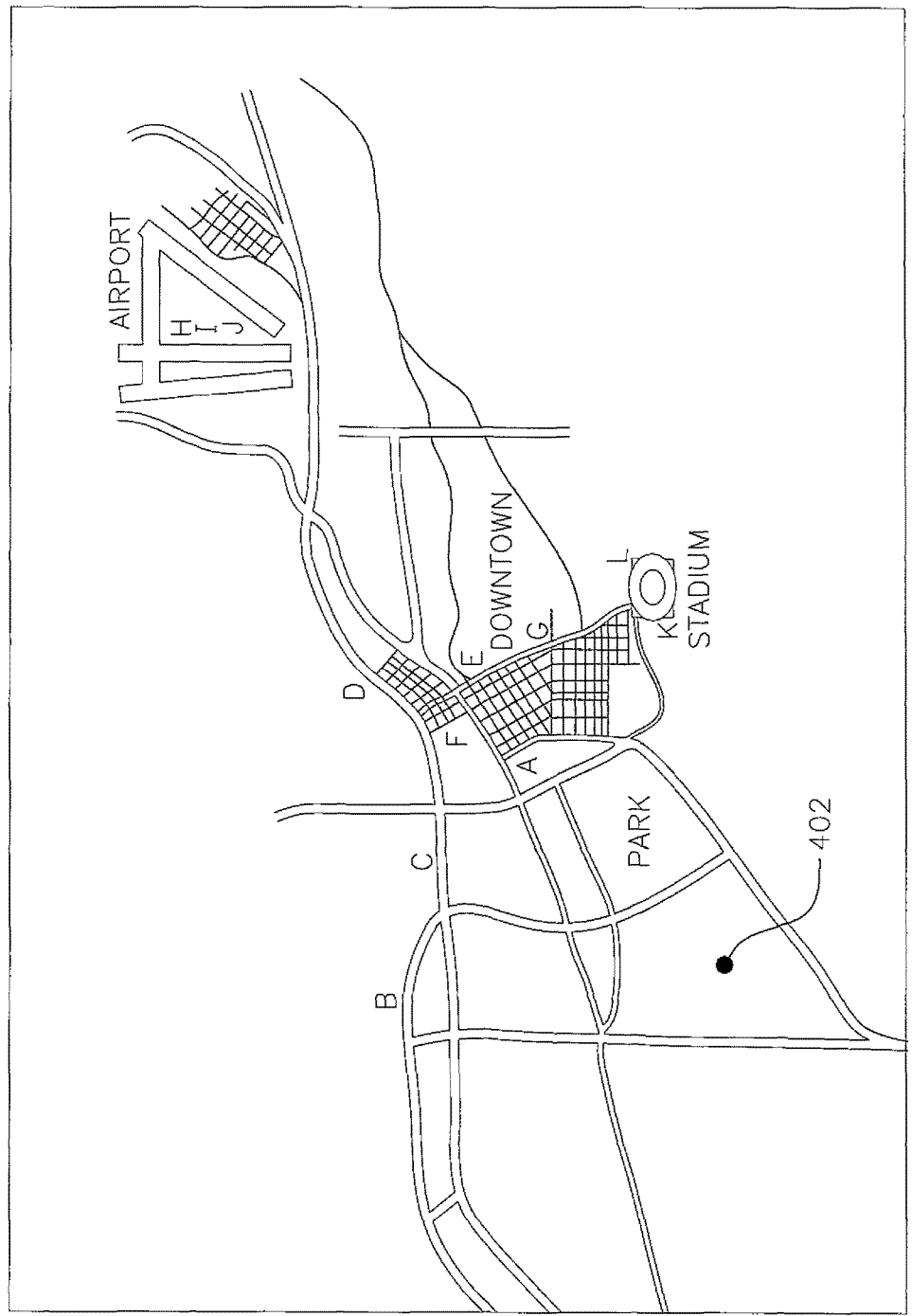
FIG. 4 illustrates an example, from an aerial perspective, of how the invention defines a geographical region and uses the aggregation of all media points within the geographical region to influence mobile and Internet content to users within the geographical region.

FIG. 4 depicts an example, from an aerial perspective, of how the invention can define a geographical region and use the aggregation of all media points within the geographical region to influence mobile and Internet ads to users within that geographical region. In this scenario, the user need not be in direct proximity to any one particular or specific media point because the emphasis is on the combined landscape of media points within the geographically defined area. The aerial depicts a small city and/or geographical area with a multitude of media points platted on the map within the geographical area. The media points labeled B, C and D are billboards lining the main round in the geographical area; media points labeled H, I and J are media points in the geographical area's main airport; media points labeled F, E and G are media points in the geographical area's downtown or central business area; media point labeled A is an LED screen located in the geographical area's primary grocery and/or department store; and media points labeled K and L are media points at the geographical area's local stadium.

While the user is currently located in a residential neighborhood and away from any media points, the user is nonetheless still influenced by the media points throughout the larger defined geographical area. The invention uses the same factors in block 108 of FIG. 1 to rank the prominence of media points within the larger geographically defined area around the user. This aggregation of media points and their importance in a geographical area can be used to influence Internet and mobile ads to all users within an area without knowing that a given user is directly in front of a particular media point.

Figure 5:
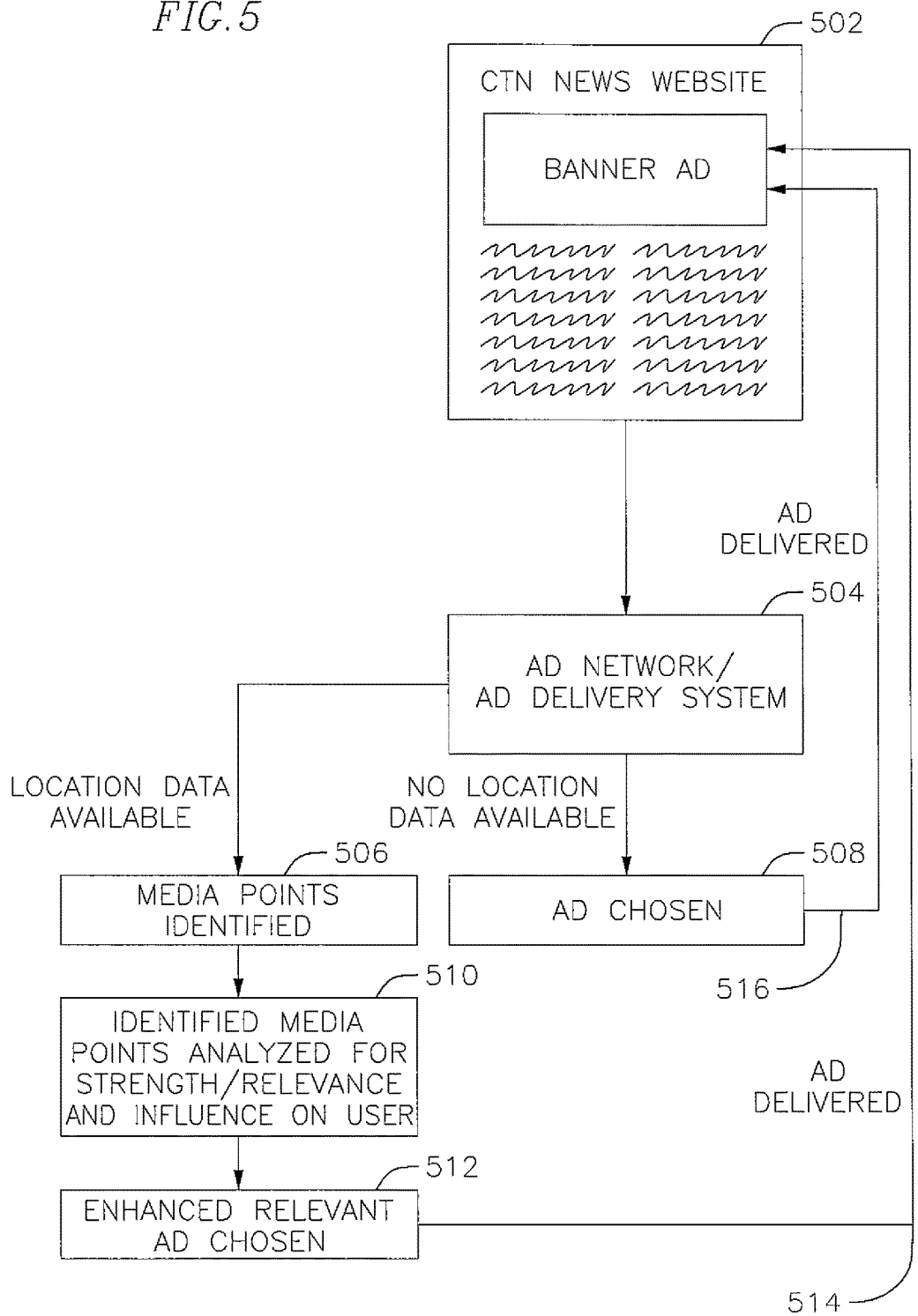
FIG. 5 is an exemplary process diagram showing content delivery to a user, according to some embodiments of the invention.

FIG. 5 is an exemplary process diagram showing content delivery to a user, according to some embodiments of the invention. It illustrates how a user's location relative to media points can be utilized to influence content delivery to the user, using for example, a web browsing application that is operating on a mobile device or any Internet enabled device, according to some embodiments of the invention. As shown in block 502, a web browser that operates on a mobile device or any other Internet enabled device, navigates to, for example, a news website. The homepage of the news website incorporates one or more banner ads at the top of the page. In block 504, the news website requests an ad from its ad network or ad delivery system. If no information is available about the user's location, the ad network chooses an ad in block 508 and delivers the ad (516) to the user, within the website. If the user's location is available, in block 506, the invention identifies all the media points near the user's location and what messages are being shown on those media points, in real time. In block 510, the invention, executing on one or more servers, identifies the media points that are most influential and relevant to the mobile or Internet user, factoring the mobile or Internet users' proximity to given media points, the size of the media point and all the other factors described above with respect to FIGS. 1A and 1B. In block 512, the invention selects one or more ads that are influenced by the relevant (close by) media points identified in block 510 and delivers the ads (514) to the user browsing the news website. The ads or any content are influenced and enhanced based on the relevant media points, their nature and contents, and user related information, as explained above.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A computer-implemented method for influencing content delivery to a mobile device used by a user based on media messages displayed by physical media points in proximity of the user, the method comprising:

receiving a request for delivery of a certain content to the user, from the mobile device, transmitted over a communication network;

obtaining a current location of the mobile device;

detecting a signal from one or more of a plurality of physical media points, wherein the plurality of physical media points includes one or more of an LED advertising display device, a signage device, a billboard device, and an LED message display device;

responsive to receiving said request, identifying a plurality of close physical media points in proximity to the obtained current location of the mobile device, each of the plurality of close physical media points currently displaying a media message unrelated to the requested certain content;

obtaining, over the communication network, type, location and display size of the identified plurality of close physical media points, from one or more databases;

determining, in real time, a content of the media message that is currently being displayed by each of the plurality of close physical media points;

determining a collective exposure of the user to said identified plurality of close physical media points based on different weight factors assigned to each identified close physical media point, wherein a larger weight factor is assigned to one or more of a physical media point when said physical media point has a larger display size, a physical media point in a captured location, a physical media point that the user spends more time being exposed to, a physical media point that displays ads for household, consumer, entertainment or eatable items, and a physical media point that displays a multi-media message;

selecting a relevant supplemental content, in addition to the requested certain content, for transmission to the mobile device, based on said collective exposure of the user to said identified plurality of close physical media points; and transmitting said selected relevant supplemental content and the requested certain content to the mobile device over the communication network for displaying on a display of the mobile device.

2. The method of claim 1, wherein said proximity to the obtained location of the mobile device is set as a system parameter, by the user.

3. The method of claim 1, wherein said proximity to the obtained location of the mobile device is changed as a function of one or more of the type, content, size and location of the physical media points.

4. The method of claim 3, wherein said proximity to the obtained location of the mobile device is further changed as a function of one or more of a time of the day, traffic, other media points in area, weather, and direction and speed of a movement of the mobile device.

5. The method of claim 1, further comprising computing a direction vector of a movement of the mobile device; and utilizing the computed direction vector in determining the collective exposure of the user to said identified plurality of close physical media points.

6. The method of claim 1, further comprising aggregating and storing a plurality of different exposures of the user to the plurality of close physical media points over a period of time; obtaining historically relevant data for preferences or behavior of the user from the aggregated data; and selecting said relevant supplemental content for delivery to the mobile device partly based on said historically relevant data.

7. The method of claim 6, wherein said aggregating of the plurality of different exposures of the user comprises of analyzing travel routes of the user over said period of time.

8. The method of claim 1, further comprising assigning different weight factors to said type, location and display size of the identified plurality of close physical media points; calculating a weighted averaging of the different weight factors; and utilizing the calculated weighted averaging for determining said collective exposure of the user to the identified plurality of close physical media points.

9. The method of claim 1, wherein said determining the collective exposure of the user to said identified plurality of close physical media points is further based on two or more of an amount of time the user is in proximity to the identified plurality of close physical media points, a nature of the content being displayed by the identified plurality of close physical media points, and images or messages displayed on the identified plurality of close physical media points.

10. The method of claim 1, wherein said determining the collective exposure of the user to said identified plurality of close physical media points is further based on a surrounding environment relative to the identified plurality of close physical media points including two or more of, traffic, weather, speed and direction of travel, types and numbers of other media points in the surrounding environment, time of day, and mobile users gender, age and preferences.

11. The method of claim 1, wherein said selected relevant supplemental content is an advertisement or a coupon.

12. The method of claim 1, wherein one or more of said contents of the media messages are changed based on said collective exposure of the user to respective ones of said identified plurality of close physical media points.

* * * * *